United States Patent Office 2,816,875
Patented Dec. 17, 1957

2,816,875

POLYAMIDE COMPOSITION AND PROCESS FOR PREPARING THE SAME

Arthur B. Beindorff, Decatur, Ala., assignor to The Chemstrand Corporation, Decatur, Ala., a corporation of Delaware No Drawing. Application June 21, 1955,
Serial No. 517,041

14 Claims. (Cl. 260—30.4)

This invention relates to new compositions of matter and more particularly, to new compositions of matter comprising synthetic linear polyamides and to methods of preparing the same.

Synthetic linear polyamides are generically referred to as "nylon." Although the polyamides as a class are microcrystalline and have fairly high and sharp melting points, they can be formed into many useful objects without the use of solvents, for example, by extruding the molten polyamide through a spinneret or elongated slit to form filaments or films. However, solutions of the polyamides are likewise useful and in many applications are more advantageous than molten compositions, such as to achieve the fluid state necessary in lacquers, coating compositions, and the like. Further, solutions of the polyamides can be wet-spun into various shaped and useful articles, such as films, fibers, filaments, rods, tapes, tubes, bristles, ribbons, sheets, etc. Very often it is desirable to prepare a fluid composition for use over a period of time and in that event it is convenient if the composition can be kept in the liquid stage by storage at ordinary temperatures.

In many applications it is necessary to incorporate additives in the polyamides, such as plasticizers or other modifying agents. Such addition is more advantageously accomplished by incorporating the additive in a solution of the polyamide rather than in the molten polyamide. Frequently, when such blending is done in a melt, there is a tendency toward discoloration and decomposition of the polymer. Further, there is a tendency with certain types of plasticizers and modifying agents to be less compatible at the high temperatures required for blending in a melt, whereas they can be readily incorporated in a polyamide solution at a low temperature. In addition, solutions of polyamides are more easily cast into films or coatings of uniform thickness, which is mechanically more difficult to accomplish with a molten composition due to its relatively high viscosity.

Many solvents for polyamides, as defined herein, have heretofore been proposed but most of these solvents are lacking in one or more particulars. The polyamides as a class characteristically require corrosive media as solvents, such as strong concentrated acids, phenols, cresols, and the like, particularly where solutions of the polyamides having useful degrees of concentration are required. Furthermore, and particularly when strong acids are used as solvents, degradation of the polyamide constitutes a serious obstacle, especially at higher temperatures and concentrations, and this is so even when phenolic solvents are employed.

Accordingly, it is a primary object of the present invention to overcome the aforementioned disadvantages and provide a new and useful solvent for synthetic linear polyamides. It is another object of the invention to provide a new and useful composition of matter comprising a synthetic linear polyamide solution which can be formed into shaped articles, such as threads, filaments, fibers, ribbons, rods, bristles, tapes, tubes, films, and the like. It is still another object of the present invention to provide a process for preparing synthetic linear polyamide solutions in a solvent which is relatively non-hazardous, non-corrosive and non-degrading. Other objects of the instant invention will be apparent from the description thereof hereinafter.

In general, the objects of the present invention are accomplished by dissolving synthetic linear polyamides in N-acetyl morpholine which has the formula:

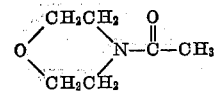

The temperature at which solution of the polyamide takes place will vary with the composition of the polyamide and its viscosity or molecular weight. Generally, however, temperatures in the range of 150° C. to 190° C. are sufficient to effect solution of the synthetic linear polyamides in N-acetyl morpholine.

The polyamides which are useful in the practice of the present invention are of the general types described in U. S. Patents 2,071,250, 2,071,253 and 2,130,948. Accordingly, throughout the instant specification and claims, the terms "synthetic linear polyamides" and "polyamides" designate the general types described in said patents.

A characteristic property of these polyamides or polymers is that they can be formed into filaments which can be cold drawn into fibers showing molecular orientation along the fiber axis. The polyamides are particularly useful for the preparation of fibers, bristles, sheets, rods, tubes, and the like. The polyamides are of two types, those obtainable from polymerizable monoaminomonocarboxylic acids and their amide-forming derivatives, for example, caprolactam, and those obtainable from the reaction of suitable diamines and suitable dicarboxylic acids or amide-forming derivatives of dibasic dicarboxylic acids. In these polyamides the amide group forms an integral part of the main chain of atoms in the polymer. On hydrolysis with strong mineral acids, the polyamides revert to monomeric polyamide-forming reactants. The polyamides may also be defined as long-chain synthetic polymeric carbonamides which have recurring carbonamide groups as an integral part of the main polymer chain and which are capable of being formed into a filament, this definition being patterned rather closely after Wakeman, "The Chemistry of Commercial Plastics," Reinhold Publishing Company, 1947, page 257. In accordance with the present invention, solutions or "dopes" containing from 5 to 25% by weight of polyamide are suitable for the formation of filaments and fibers. The concentration of the polyamides which can be obtained in solution and the viscosity of the solution depend upon the nature of the polymer, the solvent employed and the temperature. Usually, when making a solution of a polyamide which is to be employed in the manufacture of fibers and filaments, a polyamide having an intrinsic viscosity of 0.3 to 2.0 or above is employed. For example, as much as 20–25% by weight of polyhexamethylene adipamide having an intrinsic viscosity of about 0.36 can be dissolved in glutaric acid at 98° C. Polyamides having a lower molecular weight or intrinsic viscosity are employed when the solution or "dope" is to be used for coating or as a lacquer. While it is preferred to employ 5 to 25% by weight of the polyamide in the solutions when the solution is to be used in forming fibers and filaments, it is to be understood that less than 5% or more than 25% polyamide may be used when the solution is to be employed for other purposes, such as coating, or in lacquers, and the like, or when low molecular weight polyamides are employed. The amount of any specific polyamide which can be dissolved in the solvent of the present invention, will be readily evident to those skilled in the art.

Generally, heating of the solutions is accomplished on a water or oil bath. However, other means may be employed, if desired. Agitation of the mixture during the heating process is preferred but it should be understood that agitation is not always necessary nor critical. Agitation can be accomplished by any suitable means, such as by stirring, shaking, etc.

While each polymer varies somewhat in its solubility characteristics and the temperature of solvation, this invention is applicable to all synthetic linear polyamides, as hereinbefore defined. As indicated, the polyamides are generally of two types, those derived from polymerizable monoaminomonocarboxylic acids or their amide-forming derivatives, and those derived from the reaction of suitable diamines with suitable dicarboxylic acids or amide-forming derivatives of dicarboxylic acids. On hydrolysis with mineral acids, the polyamides yield monomeric polyamide-forming reactants. For example, a polyamide derived from a diamine and a dibasic acid yields on hydrolysis with hydrochloric acid, the dibasic acid and the diamine hydrochloride. Similarly, an aminoacid type polyamide yields an aminoacid hydrochloride. Particularly useful polyamides in the present invention are the simple unsubstituted polyamides, such as those formed by the reaction of tetramethylene diamine with adipic acid, tetramethylene diamine with suberic acid, tetramethylene diamine with sebacic acid, hexamethylene diamine with adipic acid, hexamethylene diamine with suberic acid, hexamethylene diamine with sebacic acid, the polymerization products of epsilon-caprolactam, etc. In addition, polymers formed from the reaction of two or more diamines with dicarboxylic acids and/or two or more dicarboxylic acids with diamines are contemplated in the practice of the instant invention. These polymers all dissolve in N-acetyl morpholine in accordance with the present invention as to do the inter-polymers which are normally insoluble in most of simple alcohols.

The most useful polyamides are the higher molecular weight polyamides, that is, those having an intrinsic viscosity of 0.3 or above, since they possess the property of being formed into filaments which can be cold-drawn. That is, filaments produced from the present polyamide compositions have the ability to accept a very high degree of permanent orientation under stress. By the application of moderate stress at ordinary temperatures these filaments can be instantly elongated or cold-drawn. The filaments can be cold-drawn as much as several times their original lengths. The cold-drawing operations may be carried out on filaments, which have been allowed to cool fully and solidify, or the cold-drawing may follow the formation of the filaments directly as one part of a continuous process. The filaments, which are cold-drawn, possess a high degree of permanent orientation along the filaments axis, as shown by characteristic X-ray patterns. These high molecular weight varieties of the polyamides are more useful for most purposes than the lower molecular weight polyamides since they excel in toughness and durability.

The polyamide compositions of the instant invention are particularly useful for the formation of shaped articles by the so-called wet-spinning technique wherein a solution or "dope" of the polyamide is extruded through a suitably shaped orifice into a bath comprising a non-solvent for the polyamide. It is particularly desirable to employ the wet-spinning technique, if at all possible, and the present invention provides the means of wet-spinning polyamide structures. The wet-spinning method has a number of advantages over the melt-spinning technique, which is presently widely used, for example, the wet-spinning method is generally more economical and can be operated at lower temperatures than melt-spinning. Because of the lower temperatures, plasticizers and other modifying agents can be more advantageously added to a solution rather than to a molten polyamide, thereby minimizing the tendency toward discoloration and decomposition. Further, there is a tendency with certain types of plasticizers and modifying agents to be less compatible at the high temperatures required for blending in a melt, whereas they can be readily incorporated in a polyamide solution at a low temperature. A still further advantage in the use of solutions lies in the ease with which they can be cast into films or coatings of uniform thickness, which is mechanically more difficult to accomplish with a molten composition due to its relatively high viscosity.

While the wet-spinning technique for forming shaped articles from polyamides is preferred, as pointed out above, it has not been employed commercially due to the scarcity of suitable solvents, since polyamides are generally insoluble in most of the well-known organic solvents. Therefore, the present invention is advantageous in that it answers a serious need which has existed for the discovery of a suitable solvent for the wet-spinning of polyamide shaped articles and one which provides polyamide solutions of suitable concentration and stability which can be prepared conveniently with standard equipment. In addition, the solvent of the present invention can readily and conveniently be recovered for reuse or re-cyling during the employment of the polyamide solutions for transforming the polyamide into other forms, such as filaments, fibers, films, and the like.

For a more detailed description of the present invention, reference is had to the following specific examples which are merely intended to be illustrative and not limitative. In the examples, all parts and percent are by weight unless otherwise indicated.

*Example I*

One part of polycaprolactam and 3 parts of N-acetyl morpholine were mixed in a tube and heated to a temperature of 170° C. The polymer dissolved readily giving a clear, homogeneous solution which was fluid. Upon heating the polymer solution to the boil (240° C.), discoloration was observed. The solution coagulated immediately when introduced into a bath of N,N-dimethylacetamide. Strong films were formed when the polycaprolactam solution was extruded into a bath containing 50% N-acetyl morpholine and 50% N,N-dimethylacetamide. The polycaprolactam solution was coagulated in water.

*Example II*

Ten parts of polyhexamethylene adipamide and 100 parts of N-acetyl morpholine were mixed in a tube and heated to a temperature of 150° C. to 160° C. The polyamide began to dissolve at 150° C. and solution was complete upon reaching 185° C. The solution obtained was clear, homogeneous and non-viscous. Good films were obtained by extruding the polymer solution or "dope" into water. Films were also obtained in baths of 50/50 water/N,N-dimethylacetamide and water/N-acetyl morpholine.

In addition to use in wet-spinning, the polyamide solutions or compositions of this invention may be employed in dry-spinning wherein the solution or dope is extruded through a suitably shaped orifice into a heated atmosphere capable of evaporating the solvent from the newly formed article.

The properties of the objects formed from the polyamide compositions herein described may be modified by appropriate modification of the compositions. Thus, the compositions of this invention may have incorporated therein various modifying agents, such as plasticizers, dyes, pigments, diluents, resins, cellulose derivatives, waxes, water repellants, luster modifying agents, flame repellants, and the like. Solutions of different polyamides, or of polyamides with other polymers or solutes can be solution blended and precipitated to give homogeneous blends, where melt blending is undesirable or impractical.

In addition to the formation of filaments, fibers, films, etc., the instant polyamide compositions can be formed into a variety of other objects, for example, bristles, surgical sutures, fishing leaders, fishline, dental floss, ribbons, sheets, safety glass inner layers, golf ball covers, and plasticized or otherwise modified solid compositions useful for making molded articles. The instant polyamide compositions are also useful for coating wire, fabrics, paper, regenerated cellulose, and the like, and for impregnating fabric, paper, and other porous materials. Numerous other advantages of the instant invention will be apparent to those skilled in the art.

As many apparently widely different embodiments of this invention may be made without departing from the spirit and scope thereof, it is to be understood that the invention is not limited to the specific embodiments thereof except as defined in the appended claims.

I claim:

1. As a new composition of matter a clear, homogeneous solution comprising a synthetic linear polyamide and N-acetyl morpholine, said polyamide being a long-chain synthetic polymeric carbonamide which has recurring carbonamide groups as an integral part of the main polymer chain and which is capable of being formed into a filament.

2. A composition of matter as defined in claim 1 wherein the polyamide is polycaprolactam.

3. A composition of matter as defined in claim 1 wherein the polyamide is polyhexamethylene adipamide.

4. A composition of matter as defined in claim 1 wherein the polyamide is polyhexamethylene sebacamide.

5. A composition of matter as defined in claim 1 wherein the polyamide is polytetramethylene adipamide.

6. A composition of matter as defined in claim 1 wherein the polyamide is polytetramethylene sebacamide.

7. A process for preparing a new composition of matter comprising mixing a synthetic linear polyamide with N-acetyl morpholine and heating said mixture to a temperature in the range of 150° C. to 190° C. to form a clear, homogeneous solution, said polyamide being a long-chain synthetic polymeric carbonamide which has recurring carbonamide groups as an integral part of the main polymer chain and which is capable of being formed into a filament.

8. The process as defined in claim 7 wherein the polyamide is polycaprolactam.

9. The process as defined in claim 7 wherein the polyamide is polyhexamethylene adipamide.

10. The process as defined in claim 7 wherein the polyamide is polyhexamethylene sebacamide.

11. The process as defined in claim 7 wherein the polyamide is polytetramethylene adipamide.

12. The process as defined in claim 7 wherein the polyamide is polytetramethylene sebacamide.

13. A process for preparing a new fiber-forming composition of matter comprising mixing a synthetic linear polyamide having an intrinsic viscosity in the range of 0.3 to 2.0 with N-acetyl morpholine, and heating said mixture to a temperature in the range of 150° C. to 190° C. to form a clear, homogeneous solution, said polyamide being employed in sufficient amount to give a solution containing from 5 to 25% by weight of the polyamide, said polyamide being a long-chain synthetic polymeric carbonamide which has recurring carbonamide groups as an integral part of the main polymer chain and which is capable of being formed into a filament.

14. As a new composition of matter, a fiber-forming solution comprising a synthetic linear polyamide having an intrinsic viscosity from 0.3 to 2.0 and N-acetyl morpholine, said polyamide being a long-chain synthetic polymeric carbonamide which has recurring carbonamide groups as an integral part of the main polymer chain and which is capable of being formed into a filament.

No references cited.